United States Patent
Green et al.

[11] Patent Number: 6,121,598
[45] Date of Patent: Sep. 19, 2000

[54] LASER TRANSMITTER INCORPORATING TARGET DITHER

[75] Inventors: Francisco Roberto Green, Tipp City; James Arthur Schneider, Verona, both of Ohio

[73] Assignee: Spectra Precision, Inc., Dayton, Ohio

[21] Appl. No.: 09/237,137

[22] Filed: Jan. 25, 1999

Related U.S. Application Data

[62] Division of application No. 08/834,476, Apr. 11, 1997, Pat. No. 5,977,534.

[51] Int. Cl.$^7$ .................................................. G01C 21/02
[52] U.S. Cl. .................................... 250/206.1; 250/559.38
[58] Field of Search .............................. 250/206.1, 206.2, 250/236, 559.38, 559.39, 216, 559.24; 372/12, 8, 9; 356/11, 17, 373, 375; 359/213, 216

[56] References Cited

U.S. PATENT DOCUMENTS

| | | | |
|---|---|---|---|
| 3,823,313 | 7/1974 | Unema | 240/44.26 |
| 3,936,197 | 2/1976 | Aldrink et al. | 356/250 |
| 4,062,634 | 12/1977 | Rando et al. | 356/248 |
| 4,221,483 | 9/1980 | Rando | 356/250 |
| 4,662,707 | 5/1987 | Teach et al. | 350/6.5 |
| 4,674,870 | 6/1987 | Cain et al. | 356/4 |
| 4,676,634 | 6/1987 | Petersen | 356/4 |
| 4,830,489 | 5/1989 | Cain et al. | 356/73 |
| 4,895,440 | 1/1990 | Cain et al. | 356/5 |
| 5,042,042 | 8/1991 | Hori et al. | 372/32 |
| 5,125,735 | 6/1992 | Oizumi et al. | 250/206.1 |
| 5,144,486 | 9/1992 | Hart | 359/629 |
| 5,148,441 | 9/1992 | Itai | 372/70 |
| 5,182,756 | 1/1993 | Waki et al. | 372/38 |
| 5,196,693 | 3/1993 | Osaragi | 250/214 |
| 5,208,452 | 5/1993 | Osaragi | 250/208 |
| 5,257,279 | 10/1993 | Dugan et al. | 372/101 |
| 5,375,663 | 12/1994 | Teach | 172/4.5 |
| 5,453,833 | 9/1995 | Kawashima et al. | 356/345 |
| 5,511,085 | 4/1996 | Marshall | 372/22 |
| 5,513,001 | 4/1996 | Ohtomo et al. | 356/249 |
| 5,517,023 | 5/1996 | Ohtomo et al. | 250/234 |
| 5,535,003 | 7/1996 | Kawashima et al. | 356/345 |
| 5,583,685 | 12/1996 | Ohtomo et al. | 359/197 |
| 5,808,771 | 9/1998 | Ohtomo et al. | 359/196 |

FOREIGN PATENT DOCUMENTS

| | | |
|---|---|---|
| 0643283A1 | 3/1995 | European Pat. Off. . |
| 6201383 | 7/1994 | Japan . |

OTHER PUBLICATIONS

"MinuteMarker General Construction/Interior Laser System Model 1462" Brochure, Published Oct. 26, 1996.
"Smart" Rotating Lasers, RL–S1A/S1B 1996 Topcon Laser Systems, Inc. (4 pages) (Month Unknown).
Marksman RL–50 Series Rotating Lasers, 1994 Topcon Laser Systems, Inc. (6 pages) (Month Unknown).

*Primary Examiner*—Que T. Le
*Attorney, Agent, or Firm*—Killworth, Gottman, Hagan & Schaeff, LLP

[57] ABSTRACT

A laser beam transmitting system is provided comprising at least one target, a laser detection module, an optical system, a rotary encoder, a dither zone memory, and a controller. The optical system is arranged to generate a reference laser beam selectively in one of a search mode and a target dither mode and to direct a laser beam reflected from the target to the laser detection module. The search mode is characterized by movement of the reference beam through a rotational arc defined about a central rotational axis and the target dither mode is characterized by movement of the reference beam through a selected discrete portion of the rotational arc. The rotary encoder is arranged to produce a rotary signal indicative of a rotary position of the reference beam relative to the rotational arc. The controller is programmed to identify a position of the at least one target based upon the reflected laser beam signal and the rotary signal, establish a dither zone associated with the target position, store data indicative of the established dither zone in the dither zone memory, establish a dither time associated with the dither zone, and cause the optical system to operate in the target dither mode wherein the reference beam moves within the dither zone for an amount of time equal to the dither time.

7 Claims, 12 Drawing Sheets

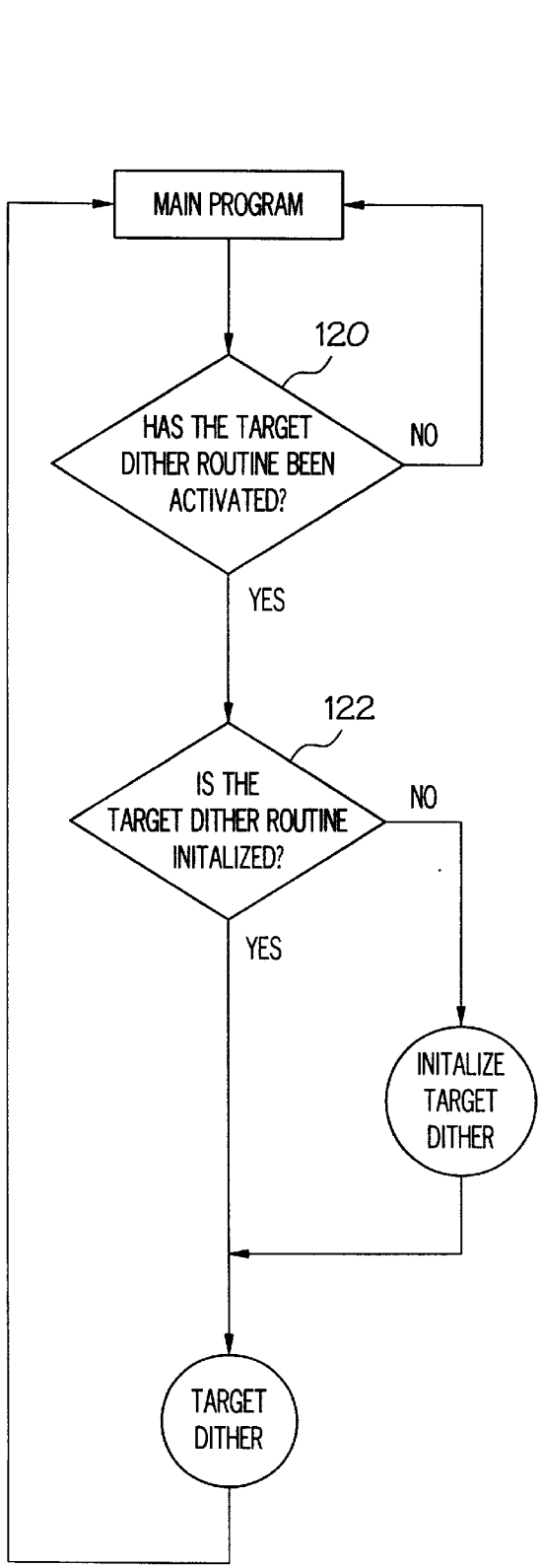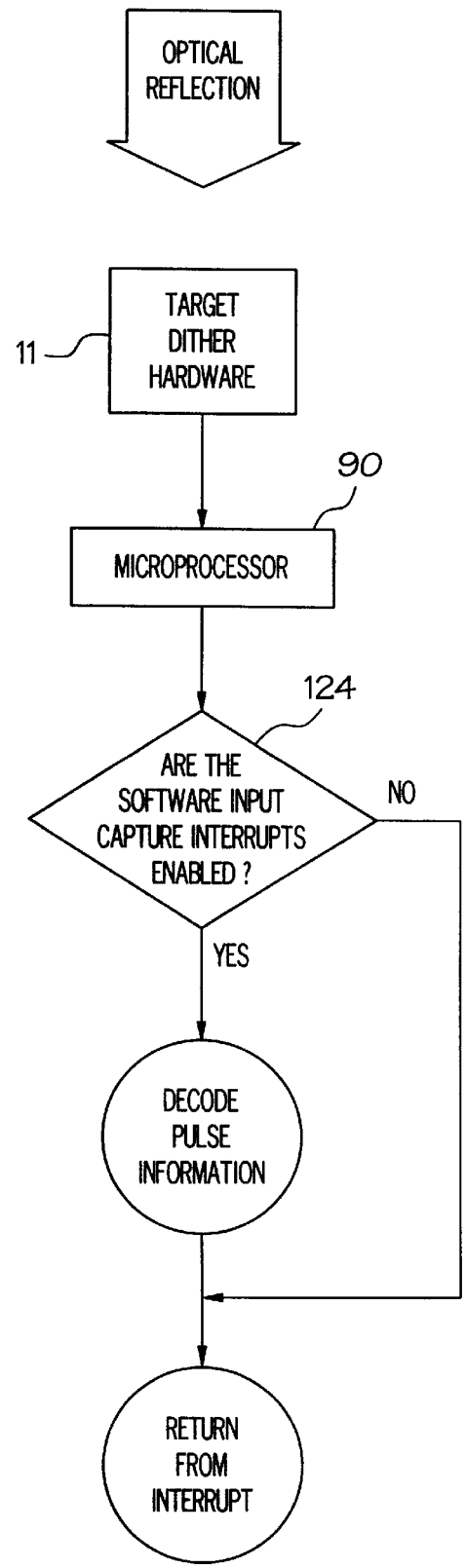
FIG. 9                    FIG. 10

LASER TRANSMITTER INCORPORATING TARGET DITHER

CROSS-REFERENCE TO RELATED APPLICATIONS

This application is a division of U.S. patent application Ser. No. 08/834,476, filed Apr. 11, 1997, now U.S. Pat. No. 5,977,534.

This application is related to commonly assigned U.S. patent application Ser. Nos.: 08/834,472, U.S. Pat. No. 5,994,688, (Attorney Docket No. SPC 299 PA), POSITION LEVELING SENSOR FOR A LASER TRANSMITTER, filed Apr. 11, 1997, by Jackson et al.; U.S. Pat. No. 5,867,522 (Attorney Docket No. SPC 300 PA), AUTOFOCUSING SYSTEM FOR A LASER TRANSMITTER, filed Apr. 11, 1997, by Green et al.; U.S. Pat. No. 5,805,362 (Attorney Docket No. SPC 301 PA), FOCUSING MECHANISM USING A THIN DIAPHRAGM, filed Apr. 11, 1997, by Hayes; and, U.S. Pat. No. 5,844,679 (Attorney Docket No. SPC 328 PA), SYSTEM FOR ADJUSTING THE ORIENTATION OF A PLANE OF LASER LIGHT, filed Apr. 11, 1997, by Detweiler et al., the disclosures of which are incorporated herein by reference.

BACKGROUND OF THE INVENTION

The present invention generally relates to transmission of a reference laser beam and, in particular, to an apparatus and method for dithering or oscillating a reference laser beam about one or more target areas.

Laser systems have been employed in numerous surveying and construction applications. In one such system, a laser light transmitting device provides a rotating laser beam which establishes a reference plane. Typically, the rotating laser beam is used to define, in effect, a continuous plane of light as a constant horizontal bench mark of elevation over an entire work area. The laser light is either detected by the naked eye or by one or more laser beam detectors placed at considerable distances from the transmitting device.

Various construction tasks can be performed based on the visual perception of the laser light. Where the laser light is to be detected by the naked eye, a reflective target is often positioned in the path of the laser light to improve visibility. Detectors are used to intercept a rotating laser beam and determine an elevation at selected points throughout the work area. Such detectors may provide a display of the beam height for an operator or may form part of a machine control system that controls or assists in the control of various pieces of equipment, such as for example bulldozers and motor-graders.

In a laser light transmitting device, a generally horizontal plane of light is produced by projecting the beam upward and then deflecting the beam ninety degrees within a pentaprism or pentamirror assembly. The pentaprism assembly is rotated about a generally vertical axis within the transmitting device to cause the horizontal beam to sweep around the axis and define the horizontal plane.

U.S. Pat. No. 5,517,023 teaches a transmitter wherein a reference laser beam is dithered at a reduced scanning speed across the face of a reflective target to improve visibility at the target. However, the transmitter taught in the aforementioned patent is limited in several respects. The transmitter disclosed in the '023 patent is capable of dithering across only a single target. It does not provide the capability of scanning multiple targets and moving selectively to previous target positions. Further, the use of reflective targets to establish a dithering reference laser beam in the prior art is problematic because system noise and other interference produced in typical working environments impairs proper detection of target position.

Accordingly, there is a need for a reference laser beam transmitter which enables laser scanning about a plurality of target positions and which provides a means whereby a scanning beam may selectively return to a previous target position, regardless of whether a target lies in the target position. Further, there is a need for a reference laser beam transmitter which reduces the probability of improper target position detection.

BRIEF SUMMARY OF THE INVENTION

These needs are met by the present invention wherein a laser beam transmitter incorporating a dither zone memory, target validation, and automatic detector gain and threshold adjustment is provided.

In accordance with one embodiment of the present invention, a laser beam transmitter is provided comprising a laser detection module, an optical system, a rotary encoder, a dither zone memory, and a controller or processor. The laser detection module is operative to produce a reflected laser beam signal. The optical system is arranged to generate a reference laser beam selectively in one of a search mode and a target dither mode and to direct a reflected laser beam to the laser detection module. The optical system defines a central rotational axis, the reference beam projects radially from the central rotational axis, the search mode is characterized by movement of the reference beam through a rotational arc defined about the central rotational axis, and the target dither mode is characterized by movement of the reference beam through a selected portion of the rotational arc. The rotary encoder is arranged to produce a rotary signal indicative of a rotary position of the reference beam relative to the rotational arc. The controller is programmed to identify a target position based upon the reflected laser beam signal and the rotary signal, establish a dither zone associated with the target position, store data indicative of the established dither zone in the dither zone memory, establish a dither time associated with the dither zone, and cause the optical system to operate in the target dither mode. In the target dither mode, the reference laser beam moves within the dither zone for an amount of time equal to the dither time.

Preferably, the controller is further programmed to cause the optical system to change from the search mode to the target dither mode by accessing the stored dither zone data. The controller may also be programmed to determine whether the target position has changed based upon the reflected laser beam signal and the rotary signal, establish a new dither zone associated with the changed target position, and store data indicative of a changed dither zone in the dither zone memory. The controller may also be programmed to cause the optical system to operate in the search mode after the passage of an amount of time equal to the dither time.

In accordance with another embodiment of the present invention, the controller is programmed to identify a plurality of target positions based upon the reflected laser beam signal and the rotary signal, establish respective dither zones associated with individual ones of the plurality of target positions, establish at least one dither time associated with the respective dither zones, and cause the optical system to operate in the target dither mode, directing the reference laser beam to each of the dither zones in succession for an amount of time equal to the dither time.

Preferably, the controller is further programmed to establish a cycle time and cause the optical system to direct the reference laser beam to each of the dither zones according to the cycle time. Also, the controller may be programmed to establish respective dither times associated with individual ones of the dither zones. The controller may be programmed to store data indicative of the established dither zone in the dither zone memory, and cause the optical system to direct the reference laser beam to successive dither zones by accessing the stored dither zone data.

In accordance with yet another embodiment of the present invention, a laser beam transmitting system is provided comprising a reflective target, a laser detection module, an optical system, a rotary encoder, and a controller. The reflective target comprises at least two discrete target portions having respective predetermined relative widths and different characteristic reflectances. The controller is programmed to identify a measured relative width of each of the discrete target portions based upon the reflected laser beam signal and the rotary signal, determine whether the reflected laser beam signal corresponds to a valid target based upon a comparison of the measured relative widths and the predetermined relative widths, and cause the optical system to generate a reference laser beam in one of the search mode and the target dither mode based upon whether the reflected laser beam signal corresponds to a valid target.

According to one aspect of the present invention, the reflective target comprises an active target portion defined by first, second, and third discrete target portions having a first, second, and third characteristic reflectances. Typically, the second characteristic reflectance is relatively low and the first and third characteristic reflectances are relatively high and substantially equal. The second target portion is bounded on opposite sides by the first and third target portions, the second characteristic reflectance is different than the first and third characteristic reflectances, and the first, second, and third discrete target portions have predetermined relative widths. The controller is preferably programmed to identify a first ratio of a measured relative width of one of the discrete target portions with respect to a measured relative width of the active target portion, determine whether the reflected laser beam signal corresponds to a valid target based upon a comparison of the first ratio and the predetermined relative widths, and cause the optical system to generate a reference laser beam in one of the search mode and the target dither mode based upon the valid target determination.

According to another aspect of the present invention, the controller is programmed to identify a second ratio of a measured relative width of the second target portion with respect to a sum of measured relative widths of the first and third target portions, based upon the reflected laser beam signal and the rotary signal, determine whether the reflected laser beam signal corresponds to a valid target based upon a comparison of the second ratio and the predetermined relative widths, and cause the optical system to generate a reference laser beam in one of the search mode and the target dither mode based upon the valid target determination.

In accordance with yet another embodiment of the present invention. A laser beam transmitter is provided comprising a controller programmed to establish predetermined gain and threshold values for the reflected laser beam signal, determine whether the reflected laser beam signal corresponds to a valid target, change at least one of the predetermined gain and threshold values where the reflected laser beam signal does not correspond to a valid target, and identify a target position based upon the reflected laser beam signal and the rotary signal where the reflected laser beam signal corresponds to a valid target. Preferably, the threshold value is decreased and the gain value is increased where the reflected laser beam signal does not correspond to a valid target.

In accordance with yet another embodiment of the present invention, a method of transmitting a laser beam is provided comprising the steps of: moving a reference laser beam through a rotational arc defined about a central rotational axis; monitoring a rotary position of the reference laser beam relative to the rotational arc; detecting a laser beam reflected from a target positioned within the rotational arc; identifying a position of the target based upon the rotary position and the reflected laser beam; establishing a dither zone associated with the target position; storing data indicative of the established dither zone in a dither zone memory; establishing a dither time associated with the dither zone; and causing the reference laser beam to operate in the target dither mode within the dither zone for an amount of time equal to the dither time.

The method may also comprise the step of causing the reference laser beam to change from the search mode to the target dither mode by accessing stored dither zone data in the dither zone memory. Further, depending upon whether a position of the target has changed based upon the reflected laser beam and the rotary position, a new dither zone associated with the changed target position may be established, and data indicative of a changed dither zone may be stored in the dither zone memory.

A plurality of target positions may be identified based upon the rotary position and the reflected laser beam and a plurality of dither zones may be established, each of the dither zones being associated with a respective target position. Data indicative of the established dither zones may be stored. A plurality of dither times, each of the dither times being associated with a respective dither zone, may be established. The optical system may then be caused to direct the reference laser beam between successive dither zones and to operate in the target dither mode within each of the dither zones for an amount of time equal to the respective dither times.

The method of transmitting a laser beam may further comprise the steps of: establishing predetermined gain and threshold values for detecting the reflected laser beam; determining whether the reflected laser beam corresponds to a valid target; changing at least one of the predetermined gain and threshold values where the reflected laser beam does not correspond to a valid target; and identifying a target position based upon the reflected laser beam and the rotary position where the reflected laser beam corresponds to a valid target.

The method of transmitting a laser beam may also further comprise the steps of: identifying a measured relative width of at least two discrete target portions within the target based upon the reflected laser beam and the rotary position; determining whether the reflected laser beam corresponds to a valid target based upon a comparison of the measured relative widths and predetermined relative widths of the discrete target portions and the active target portion; and causing the optical system to generate a reference laser beam in one of the search mode and the target dither mode based upon the valid target determination.

In accordance with yet another embodiment of the present invention, a laser beam transmitting system is provided comprising at least one target, a laser detection module, an optical system, a rotary encoder, a dither zone memory, and a controller. The digital controller is programmed to identify a position of the at least one target based upon the reflected laser beam signal and the rotary signal, establish a dither zone associated with the target position, store data indicative of the established dither zone in the dither zone memory, establish a dither time associated with the dither zone, and cause the optical system to operate in the target dither mode wherein the reference beam moves within the dither zone for an amount of time equal to the dither time.

The at least one target may comprise a plurality of targets and the controller may be further programmed to: identify a plurality of target positions based upon the reflected laser beam signal and the rotary signal; establish respective dither zones associated with individual ones of the plurality of target positions; establish respective dither times associated with individual ones of the dither zones; and cause the optical system to direct the reference laser beam between successive dither zones and to operate in the target dither mode within each of the dither zones for an amount of time equal to the respective dither times.

The controller may be further programmed to: establish predetermined gain and threshold values for the reflected laser beam signal; determine whether the reflected laser beam signal corresponds to a valid target; change at least one of the predetermined gain and threshold values where the reflected laser beam signal does not correspond to a valid target; and identify a target position based upon the reflected laser beam signal and the rotary signal where the reflected laser beam signal corresponds to a valid target.

The at least one target may comprise a reflective target comprising at least two discrete target portions, the discrete target portions having respective predetermined relative widths and different characteristic reflectances. In which case the controller may be programmed to identify a measured relative width of each of the discrete target portions based upon the reflected laser beam signal and the rotary signal, determine whether the reflected laser beam signal corresponds to a valid target based upon a comparison of the measured relative widths and the predetermined relative widths, and cause the optical system to generate a reference laser beam in one of the search mode and the target dither mode based upon whether the reflected laser beam signal corresponds to a valid target.

In accordance with yet another embodiment of the present invention, a laser beam transmitting system is provided comprising a reflective target comprising at least two discrete target portions, a laser detection module, an optical system arranged to generate a reference laser beam in an operational mode, and a controller programmed to identify a measured relative width of each of the discrete target portions based upon the reflected laser beam signal, and determine whether the reflected laser beam signal corresponds to a valid target based upon a comparison of the measured relative widths and the predetermined relative widths.

In accordance with yet another embodiment of the present invention, a method of transmitting a laser beam is provided comprising the steps of: moving a reference laser beam in an operational mode, wherein the operational mode is characterized by movement of the reference beam through a rotational arc defined about a central rotational axis; detecting a laser beam reflected from a target positioned within the rotational arc; identifying a position of the target based upon the reflected laser beam; identifying a measured relative width of at least two discrete target portions within the target based upon the reflected laser beam; and determining whether the reflected laser beam corresponds to a valid target based upon a comparison of the measured relative widths and predetermined relative widths of the at least two discrete target portions.

In accordance with yet another embodiment of the present invention, a laser beam transmitting system is provided comprising a reflective target comprising at least two discrete target portions, a laser detection module, an optical system arranged to generate a reference laser beam in an operational mode, and a controller programmed to establish predetermined gain and threshold values for the reflected laser beam signal, determine whether the reflected laser beam signal corresponds to a valid target, change at least one of the predetermined gain and threshold values where the reflected laser beam signal does not correspond to a valid target, and identify a target position based upon the reflected laser beam signal where the reflected laser beam signal corresponds to a valid target.

In accordance with yet another embodiment of the present invention, a method of transmitting a laser beam is provided comprising the steps of: moving a reference laser beam in an operational mode, wherein the operational mode is characterized by movement of the reference beam through a rotational arc defined about a central rotational axis; detecting a laser beam reflected from a target positioned within the rotational arc; identifying a position of the target based upon the reflected laser beam; establishing predetermined gain and threshold values for detecting the reflected laser beam; determining whether the reflected laser beam corresponds to a valid target; changing at least one of the predetermined gain and threshold values where the reflected laser beam does not correspond to a valid target; and identifying a target position based upon the reflected laser beam position where the reflected laser beam corresponds to a valid target.

Accordingly, it is an object of the present invention to provide a laser beam transmitter incorporating means whereby a plurality of dither zones may be stored in memory and accessed according to a predetermined program, target positions may be reliably validated, and detector gain and threshold may be adjusted automatically.

BRIEF DESCRIPTION OF THE SEVERAL VIEWS OF THE DRAWINGS

FIGS. 9–15 are flow charts illustrating the system operational steps according to the present invention.

DETAILED DESCRIPTION OF THE INVENTION

Figure 1:
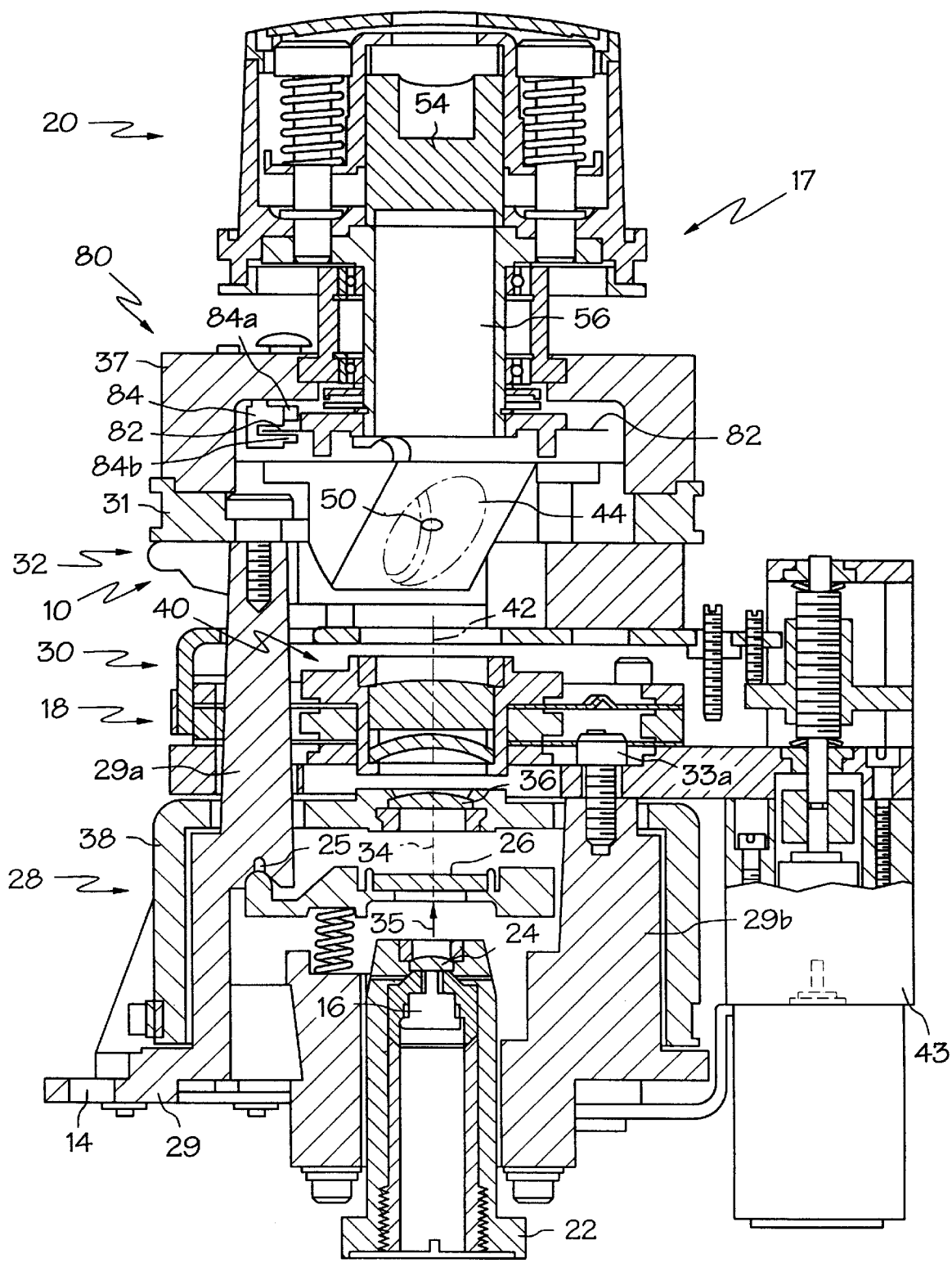
FIG. 1 is a cross-sectional view of a laser transmitter according to the present invention.
Figure 2:
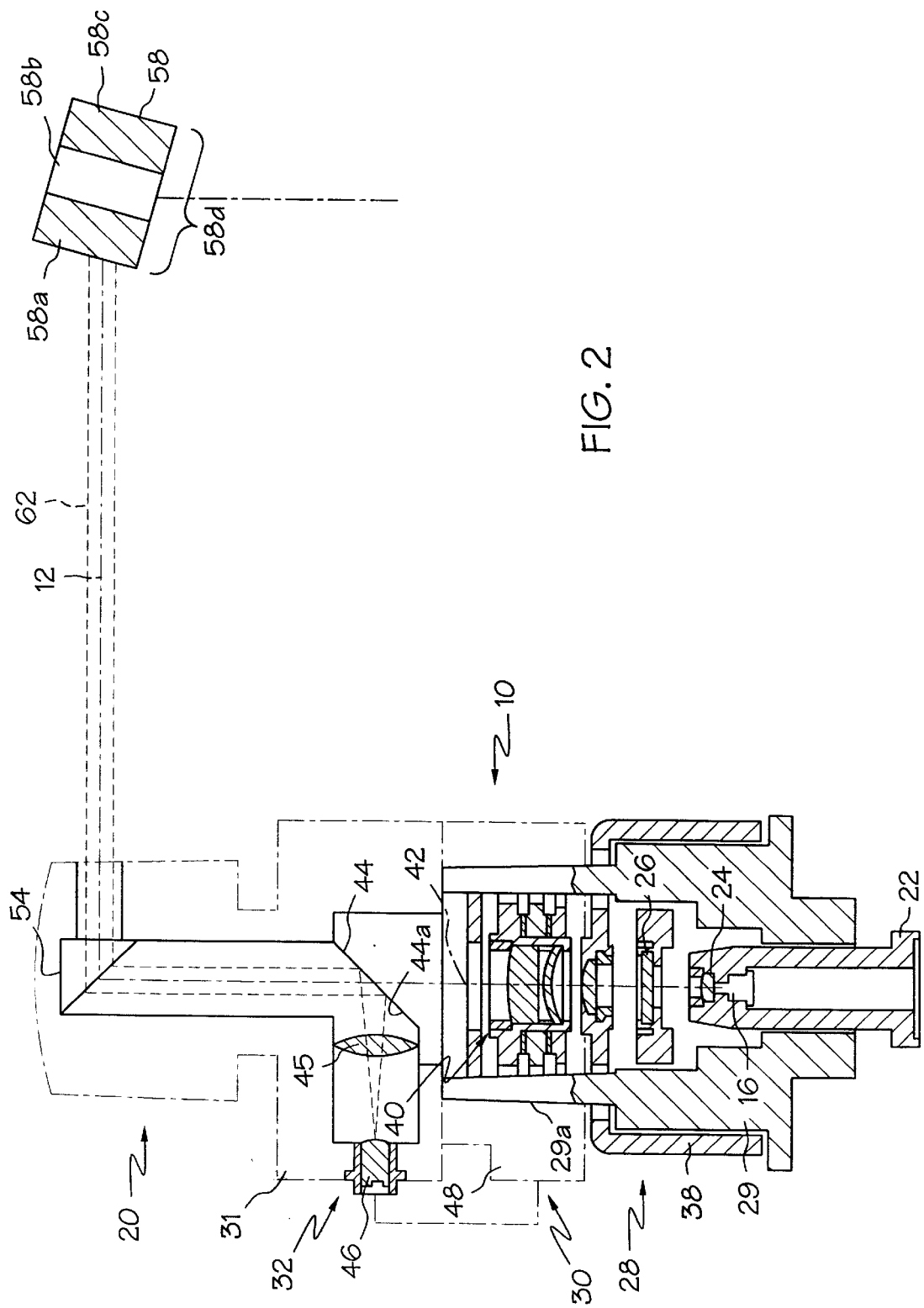
FIGS. 2 and 3 are schematic illustrations of laser beam transmitting systems according to the present invention.

Referring now to FIGS. 1 and 2, a laser beam transmitter 10 for generating a reference laser beam 12 is shown. The laser beam transmitter 10 includes a housing 14, a light source 16, and an optical system 17 including an optical assembly 18 and an optical projecting device 20. The light source 16 is coupled to a light source assembly 22. According to the illustrated embodiment, the light source 16 is a laser diode which generates the reference laser beam 12. The light source assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28, and a focusing mechanism 30. The compensator assembly 28 includes an optics frame 29, a compensator cup 38 and a wire clamp ring 31. The optics frame 29 is coupled to and supported by the housing 14. The light source assembly 22 is coupled to the optics frame 29. The flat window 26 is positioned above the collection lens 24, and is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical or a central rotational axis 34. The laser beam 12 will therefore be plumb, i.e., substantially vertical, when the optics frame 29 is positioned along a plane which is substantially parallel with respect to the plane of the ground, i.e., substantially level. The laser beam 12 is projected in the first direction 35 by the light source 16 and the collection lens 24 and made plumb along the first axis 34 through the flat window 26. It should be apparent that the laser beam 12 will be plumb as long as the optics frame 29 is substantially level with respect to the ground.

The compensator assembly 28 optically adjusts the position of the laser beam 12 so that it is plumb even when the optics frame 29 is not substantially level. The compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts (only one post 29a shown). The compensator cup 38 is free to move when the compensator cup 38 is level within 12 minutes. As long as the compensator cup 38 is within 12 minutes of level, the compensating lens 36 may translate along the X and Y axes and optically adjust the position of the laser beam 12 so that it is plumb as it emerges from the compensator cup 38. The housing 14 is provided within an automatic or manual leveling device (not shown) to place the compensator assembly 28 within 12 minutes of level. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along the first axis 34, either singularly or in tandem.

The focusing mechanism 30 is positioned above the compensator cup 38 and is coupled to the optics frame 29 through three small posts (only one small post 29b shown) by three fasteners (only one fastener 33 shown). The three posts 29a of the optics frame 29 pass through the focusing mechanism 30 so that the focusing mechanism 30 does not contact the compensator cup 38. The focusing mechanism 30 includes a focusing lens 40 which is translated along the first axis 34 to adjust the focus of the laser beam 12. The focusing mechanism 30 is positioned so that the first axis 34 coincides with an optical axis 42 of the focusing lens 40. A plumb laser beam 12 is focused by the focusing mechanism 30. The focusing mechanism 30 includes a focus motor 43 coupled to the focusing lens 40. The focus motor 43 is adapted to change the position of the focusing lens 40 thereby adjusting the focus of the laser beam 12.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser beam transmitter 10.

A laser detection module 32 is coupled to the optics frame 29 and is positioned above the focusing mechanism 30. As shown in FIGS. 2 and 6B, the detection module 32 includes a reflector 44, a lens 45, a photodetector 46 and a detector circuit 48 and is operative to produce a reflected laser beam signal 64. The reflector 44 includes an aperture 50 positioned along optical axis 42, see FIG. 1. The aperture 50 is sized to pass the laser beam 12. The reflector 44 also includes a reflective surface 44a to reflect returned light to the photodetector 46.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical and direct the laser beam 12 such that it projects radially from the central rotational axis 34. The pentaprism 54 is a structure which deflects incoming light at a ninety degree angle with respect to the vertical regardless of the incident angle of the light on the pentaprism 54. Consequently, the incoming light does not have to hit the pentaprism 54 at an exact location in order to be deflected ninety degrees.

Figure 3:
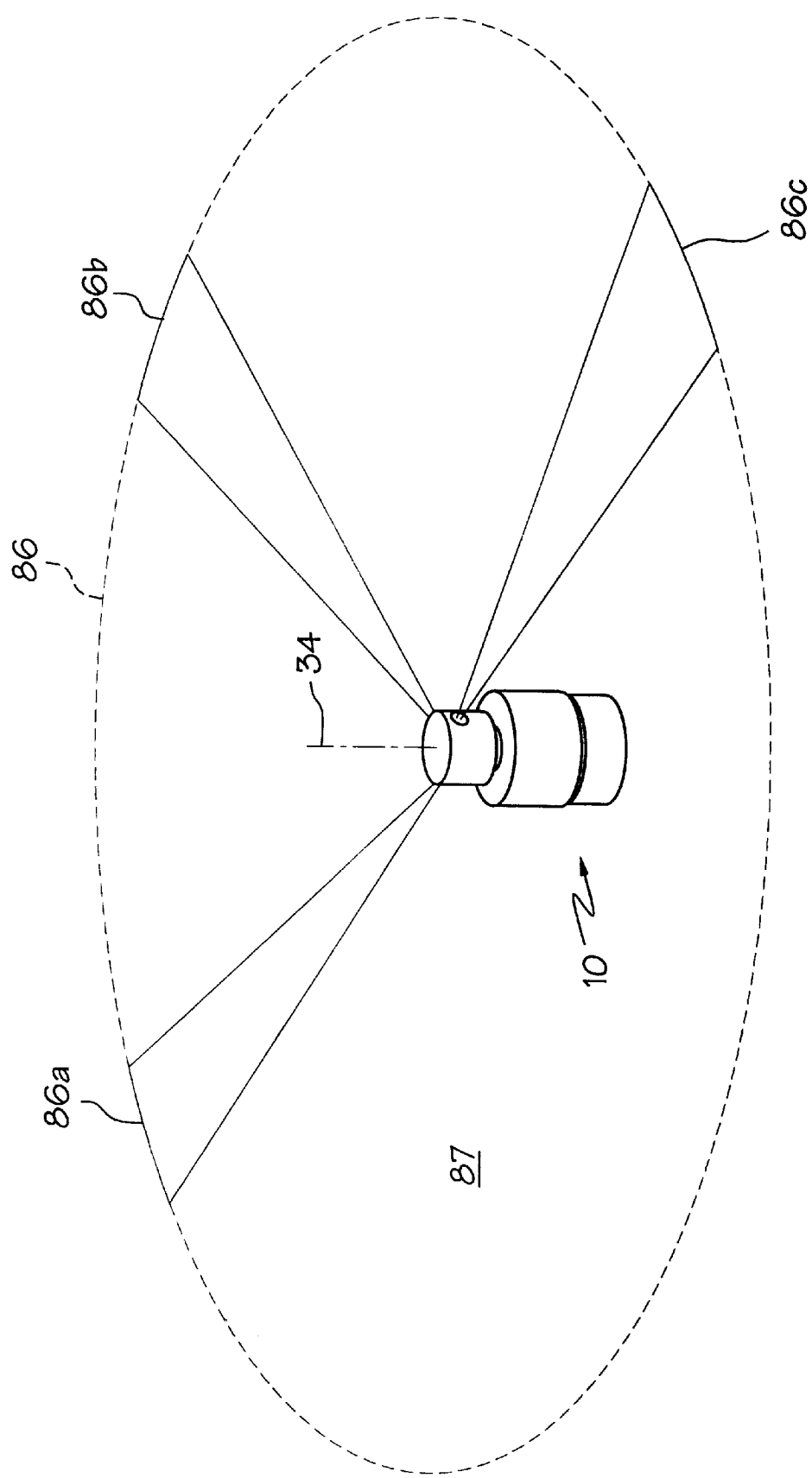

Referring now to FIGS. 2 and 3 two operational modes of the present invention is described, i.e. a search mode and a target dither mode. In the search mode, the pentaprism 54 is rotated with the spindle 56 by the motor at a speed of approximately 50 rpm to move the reference laser beam 12 through a rotational arc 86 about the central axis 34 and define a substantially horizontal plane of light 87. Alternatively, in the target dither mode, the pentaprism 54 is rotated back and forth through a selected discrete portion 86a, 86b, 86c of the rotational arc 86.

A speed of 50 rpm is well suited for visible perception of the laser light 12 by the user. However, as will be appreciated by those skilled in the art, the pentaprism 54 may be rotated at any reasonable speed without departing from the scope of the present invention. Further, while a pentaprism is used in the illustrated embodiment to deflect the incoming light, other light deflecting devices, such as a pentamirror, mirror, prism, reflector or refractor may also be used.

The laser beam transmitter 10 also includes an optical rotary encoder 80 arranged to produce a rotary signal indicative of a rotary position of the reference laser beam 12 relative to the rotational arc 86. The optical rotary encoder 80 includes an encoder disc 82 and a read head 84. The encoder disc 82 has graduations around its periphery which are read by the read head 84. The read head 84 includes an optical source 84a and an optical detector 84b. The encoder disc 82 is positioned between the optical source 84a and the optical detector 84b so that as the encoder disc 82 rotates, the read head 84 generates a signal representative of the rotary position of the encoder disc 82, and hence, the pentaprism 54 and the reference laser beam 12. As is well known in the art, the encoder disc 82 may contain graduations which are spaced in a manner so that each position around the disc is uniquely referenced. Alternatively, as is the case in the illustrated embodiment, the encoder disc 82 may contain a reference mark and a number of equally spaced graduations so that the position around the disc is referenced to the reference mark. It is contemplated by the present invention that a variety of positional indicators may be provided on the encoder disc 82 and that a corresponding variety of read head 84 elements may be provided to recognize or decode the positional indicators.

Figure 6A:
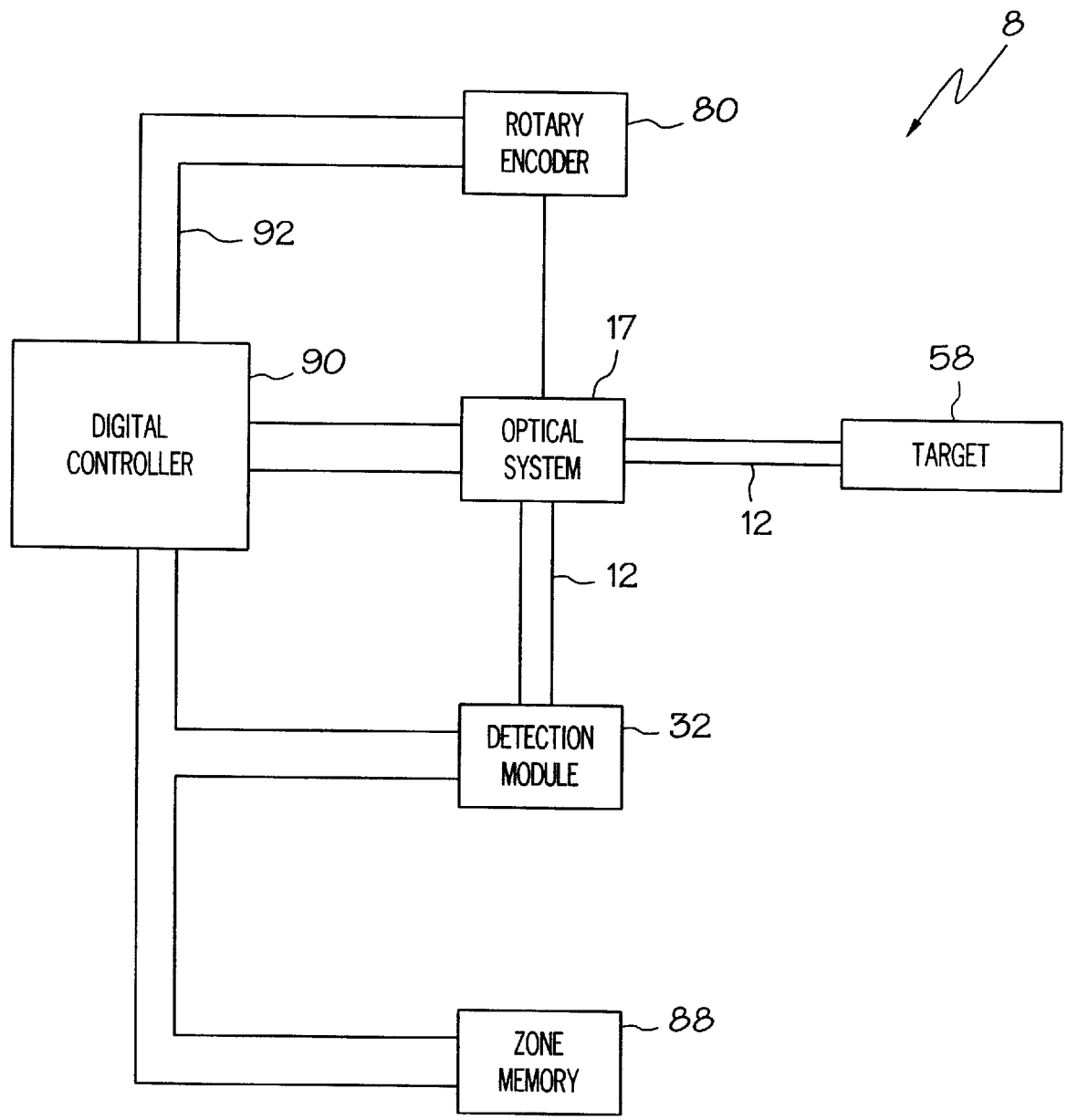
FIG. 6A is a schematic illustration of a laser transmission system according to the present invention.
Figure 6B:
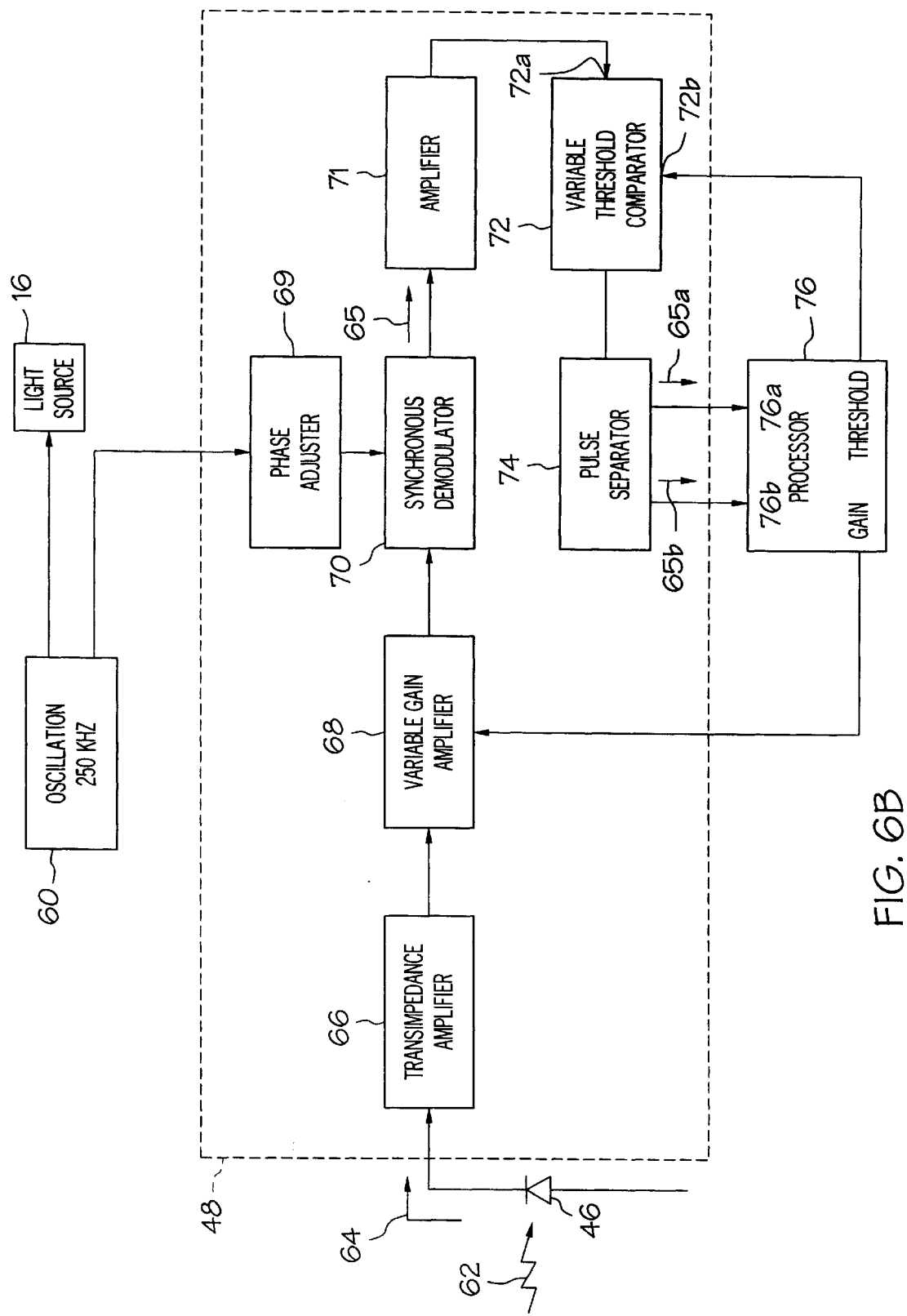
FIG. 6B is a schematic illustration of a portion of a laser detection module of a laser transmitter according to the present invention.

Referring now to FIGS. 2, 6A and 6B, a laser beam transmitting system 8 according to the present invention is described. The transmitting system 8 includes a reflective target 58, the laser detection module 32, the optical system 17, the rotary encoder 80, a dither zone memory 88, and a digital controller 90, most commonly a digital central processing unit (CPU). The digital controller 90, also referred to herein as a processor, communicates with the other system components via data bus 92. The laser beam 12 is illustrated schematically as a double line in FIG. 6A.

The reflective target 58 comprises an active target portion 58d defined by three discrete target portions 58a, 58b, 58c having respective predetermined widths a, b, c, and characteristic reflectances $R_A$, $R_B$, $R_C$. Preferably, the second target portion 58b is bounded on opposite sides by the first and a third target portions 58a, 58c, and the second characteristic reflectance $R_B$ is relatively low, as compared to the first and third characteristic reflectances $R_A$, $R_C$, which are relatively high and substantially equal. It will be appreciated by those skilled in the art that the target 58 may comprise more than three total sections. It will be further appreciated by those skilled in the art that the sections may have different or equal widths. The detection module 32 is designed to detect light reflected from the target 58 and produce the reflected laser beam signal 64.

In the illustrated embodiment, the target 58 is comprised of a single integral unit including discrete target portions 58a, 58b, 58c. However, the target 58 may be comprised of discrete first and third portions 58a, 58c coupled together with an empty space therebetween representing the second portion 58b. Further, the target 58 may comprise separate and distinct portions 58a, 58b and 58c which are positioned a set distance from each other, or separate and distinct reflective sections 58a, 58c separated a set distance from each other.

During transmission, the laser beam 12 is modulated by an oscillator 60 which supplies power to the light source 16, as shown in FIG. 6B. The laser beam 12 is modulated to distinguish the laser beam 12 from other light sources, such as any of the numerous other ambient light sources. Preferably, the oscillator 60 generates a 250 Khz carrier oscillation signal. It will be appreciated by those skilled in the art that other frequencies may be used to modulate the laser beam 12. It should be further appreciated by those skilled in the art that the laser beam 12 may be transmitted without any modulation. As shown in FIG. 2, the modulated laser beam 12 is swept across the target 58. A reflected beam of laser light 62 is reflected back towards the laser beam transmitter 10. For clarity and ease of description, the reflected beam of laser light 62 has been given a separate designation from the laser beam 12.

The reflected beam of laser light 62 consists of two pulses of light each time the laser beam 12 is reflected from the first and second reflective sections 58a, 58c of the target 58. The reflected light 62 is received by the pentaprism 54 and reflected towards the reflector 44. The reflected light 62 is then reflected by the reflective surface 44a of reflector 44 and focused by the lens 45 onto the photodetector 46.

Figure 4:
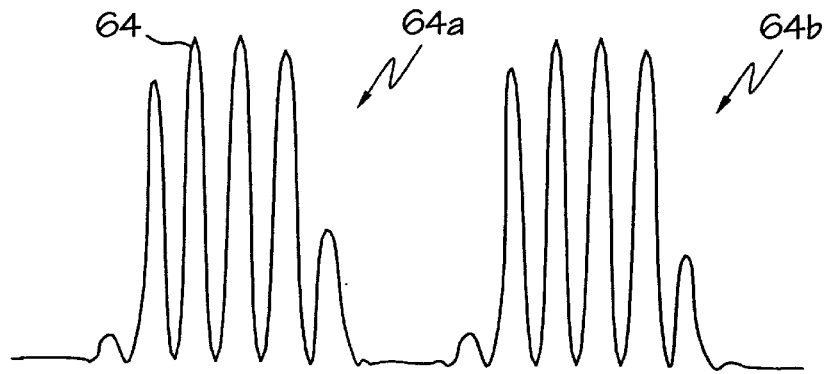
FIG. 4 is a waveform representative of modulated light reflected from the target of FIG. 2.

As shown in FIG. 4, the photodetector 46 generates the reflected laser beam signal 64 having a waveform representative of the reflected light 62. In the illustrated embodiment, the photodetector 46 is a PIN diode such that the signal 64 is in current form. The waveform comprises two pulses representative of the time periods in which the laser beam 12 sweeps across the first and second reflective sections 58a, 58c of the target 58. The signal 64 is basically an amplitude modulated signal with a data signal portion 65 and the 250 Khz carrier oscillation signal portion 67 (see FIGS. 5A and 5B). The signal 64 is transmitted to the detector circuit 48, see FIG. 6B.

Referring to FIG. 6B, the detector circuit 48 includes a transimpedance amplifier 66, a variable gain amplifier 68, a phase adjuster 69, a synchronous demodulator 70, an amplifier 71, a variable threshold comparator 72 and a pulse separator 74. The photodetector 46 is coupled to the transimpedance amplifier 66. The transimpedance amplifier 66 converts the current form of the reflected laser signal 64 generated by the photodetector 46 to a voltage form of the signal 64. The voltage form of the signal 64 is transmitted to the variable gain amplifier 68. In the illustrated embodiment, the variable gain amplifier 68 has a low gain mode and a high gain mode. The low gain mode is used when the target 58 is close to the laser beam transmitter 10 since more light is reflected back. The high gain mode is used when the target 58 is far from the laser beam transmitter 10 since less light is reflected back. The variable gain helps prevent the detector circuit 48 from saturating when an excessive amount of light is reflected back to the laser beam transmitter 10. It will be appreciated by those skilled in the art that the transimpedance amplifier 66 could be a variable gain transimpedance amplifier. It will be fully appreciated by those skilled in the art that the detector circuit 48 could be prevented from going into saturation by using a conventional clipping circuit.

Figure 5A:
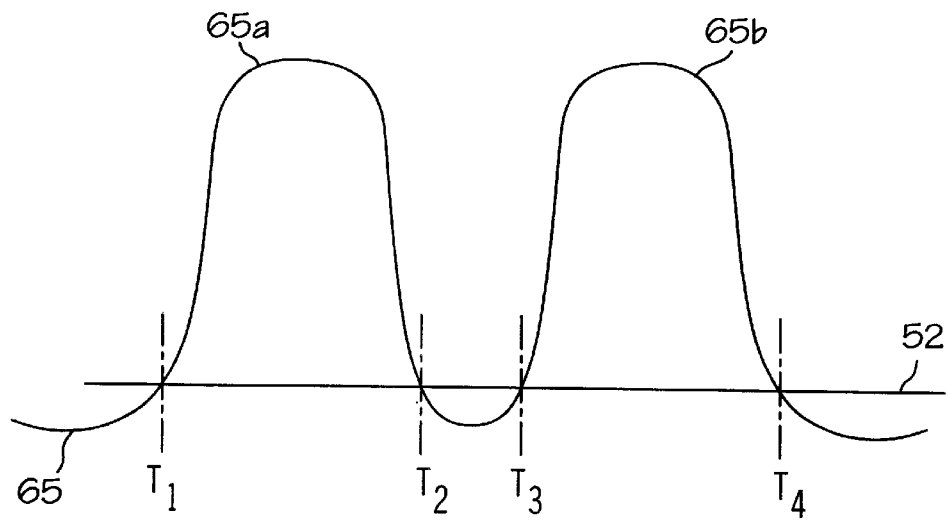
FIG. 5A is a waveform of a data signal portion of the waveform of FIG. 4.
Figure 5B:
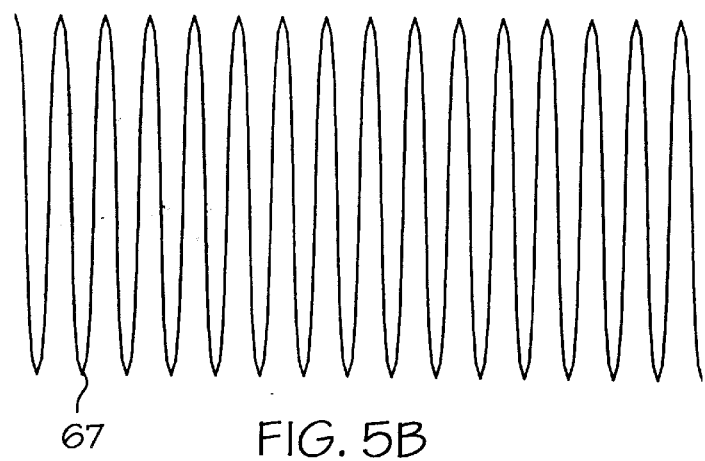
FIG. 5B is a waveform of a carrier oscillation portion of the waveform of FIG. 4.

The phase adjuster 69 receives the carrier oscillation signal which was used to modulate the laser beam 12. The phase adjuster 69 adjusts the phase of the carrier oscillation signal to match the phase of the reflected laser beam signal 64. The adjusted oscillation signal is fed to the synchronous demodulator 70 along with the signal from the variable gain amplifier 68. The synchronous demodulator 70 separates the carrier oscillation signal portion 67 from the data signal portion 65. As shown in FIG. 5A the data signal portion 65 comprises a first pulse 65a and a second pulse 65b. The synchronous demodulator 70 outputs the data signal portion 65 which is then amplified by the amplifier 71.

The amplified data signal portion 65 is inputted into a first input 72a of the variable threshold comparator 72. A second input 72b of the variable threshold comparator 72 receives a threshold voltage which sets the threshold capability of the variable threshold comparator 72. A threshold voltage is used to filter out background noise that may be detected by the photodetector 46. The variable threshold comparator 72 outputs the portions of the amplified data signal portion 65 which exceed the voltage threshold as established by the second input 72b. As the laser beam 12 is swept across the reflective sections 58a, 58c, the data signal pulses 65a, 65b extracted by the detection circuit 48 should exceed the threshold voltage.

The threshold voltage may be adjusted based on the approximate distance between the target 58 and the laser beam transmitter 10. A lower threshold voltage may be set when a relatively weak signal is received while a higher threshold voltage may be set when a relatively strong signal is received. A stronger signal will be generated as the target 58 is moved closer to the laser beam transmitter 10. A suitable threshold 52 is illustrated graphically in FIG. 5A.

The amplified data signal portion 65 outputted from the variable threshold comparator 72 is inputted into the pulse separator 74. The pulse separator 74 separates the two pulses 65a, 65b into separate component pulses, i.e. the first pulse 65a and the second pulse 65b. The first pulse 65a is transmitted to a first timer input 76a of a processor 76 while the second pulse 65b is transmitted to a second timer input 76b of the processor 76. The processor 76, which may be integrated with the digital controller 90 illustrated herein with reference to FIG. 6A, includes an internal clock and an edge detector which establish the time interval in which a transition is made by each pulse 65a, 65b. As shown in FIG. 5A, the first transition is set as $T_1$, the second transition is set as $T_2$, the third transition is set as $T_3$ and the fourth transition is set as $T_4$.

The first time period, $T_2-T_1$, represents the duration of time in which the laser beam 12 sweeps across the first reflective section 58a of the target 58. The second time period or deadband period, $T_3-T_2$, represents the duration of time in which the laser beam 12 sweeps across the non-reflective section 58b of the target 58. The third time period, $T_4-T_3$, represents the duration of time in which the laser beam 12 sweeps across the second reflective section 58c of the target 58. Accordingly, the first, second, and third time periods are proportional to the respective widths of the discrete target portions 58a, 58b, 58c.

According to one embodiment of the present invention, the controller 90 is programmed to identify the position of the target 58 based upon the reflected laser beam signal 64 and the rotary signal. In the search mode, the reference laser beam 12 is moved through the rotational arc 86 to define a substantially horizontal plane of light. The reflective target 58, positioned in the path of the laser beam 12, causes a portion of the reference laser beam 12 to return to the optical system 17 and be directed to the laser detection module 32. Thus, when the laser beam 12 sweeps across the first and second reflective sections 58a, 58c of the target 58, the amplitude of the reflected laser beam signal 64 produced by the detection module 32 cycles through a pair of reflective pulses 64a, 64b. Because the rotary signal is indicative of the rotary position of the reference laser beam 12 relative to the rotational arc 86, the position of the target 58, relative to the rotational arc 86, is determined by identifying the rotary position of the laser beam 12 when the laser beam 12 sweeps across the target 58.

The controller 90 is programmed to establish a dither zone associated with the target position. The dither zone corresponds to a selected discrete portion 86a, 86b, 86c of the rotational arc 86 relative to the target position. For example, according to one embodiment of the present invention, a predetermined angular dither zone of about +/−3 degrees is established about the target position. The size of the angular dither zone typically varies from 2.7° to 10°, depending upon the distance between the transmitter 10 and the reflective target 58, i.e., as the target 58 moves away from the transmitter 10 the angular bounds of the dither zone decrease.

Data indicative of the established dither zone is stored in the dither zone memory 88 to enable proper control of the laser transmitter 10 within each dither zone 86a, 86b, 86c. Specifically, positional or angular data indicative of the location of respective dither zones, focusing data indicative of the proper focus settings for respective dither zones, distance data indicative of the distance to targets 58 associated with respective dither zones, rotational and target speed data associated with respective dither zones, i.e., the speed at which the optical system 17 rotates the laser beam 12 and the speed at which the target 58 is moving, gain and threshold data associated with respective dither zones, and any other data representative of, or related to, the respective dither zones are stored in the dither zone memory 88.

A dither time is associated with the dither zone and the controller 90 is programmed to cause the optical system 17 to operate in the target dither mode for an amount of time equal to the dither time. In the target dither mode, the reference laser beam 12 moves back and forth across the target 58, reversing direction at the bounds of the respective dither zones 86a, 86b, 86c. After expiration of the dither time, the optical system either returns to the search mode to search for another target 58 or moves to successive dither zones in the manner described below with reference to the dither zone memory.

The controller 90 is further programmed to cause the optical system 17 to change from the search mode, wherein the reference laser beam 12 is moved through the rotational arc 86 to define a substantially horizontal plane of light, to the target dither mode by either reading the reflected laser beam signal 64 or by accessing the stored dither zone data in the dither zone memory 88. In this manner, the laser transmitter 10 may be caused to dither about a target 58 held in the path of the laser beam 12 or dither within a previously stored dither zone.

In another embodiment of the present invention, the controller 90 is programmed to identify a plurality of target positions based upon the reflected laser beam signal 64 and the rotary signal. Data indicative of target positions is stored in the dither zone memory 88. In this manner, respective dither zones associated with individual ones of the plurality of target positions are established. At least one dither time is associated with the respective dither zones and the controller 90 is programmed to cause the optical system 17 to operate in the target dither mode by directing the reference laser beam 12 to each of the dither zones in succession for an amount of time equal to the dither time.

Similarly, in another embodiment of the present invention, the controller 90 is further programmed to establish a cycle time and cause the optical system 17 to direct the reference laser beam 12 to each of the dither zones according to the cycle time. For example, where three dither zones are established, the laser beam 12 is caused to dither within each zone for an amount of time equal to one-third of the total cycle time. Alternatively, respective dither times associated with individual ones of the dither zones may be established. Preferably, the controller 90 is programmed to store data indicative of each established dither zone in the dither zone memory, and cause the optical system 17 to direct the reference laser beam 12 to successive dither zones by accessing the stored dither zone data.

While operating in the dither mode, the controller 90 is programmed to determine whether the position of a target 58 held within a dither zone 86a, 86b, 86c has changed. This determination is again based upon the reflected laser beam signal 64 and the rotary signal. If the position has changed, a new dither zone 86a, 86b, 86c is established and data indicative of a changed dither zone is stored in the dither zone memory 88.

Figure 7:
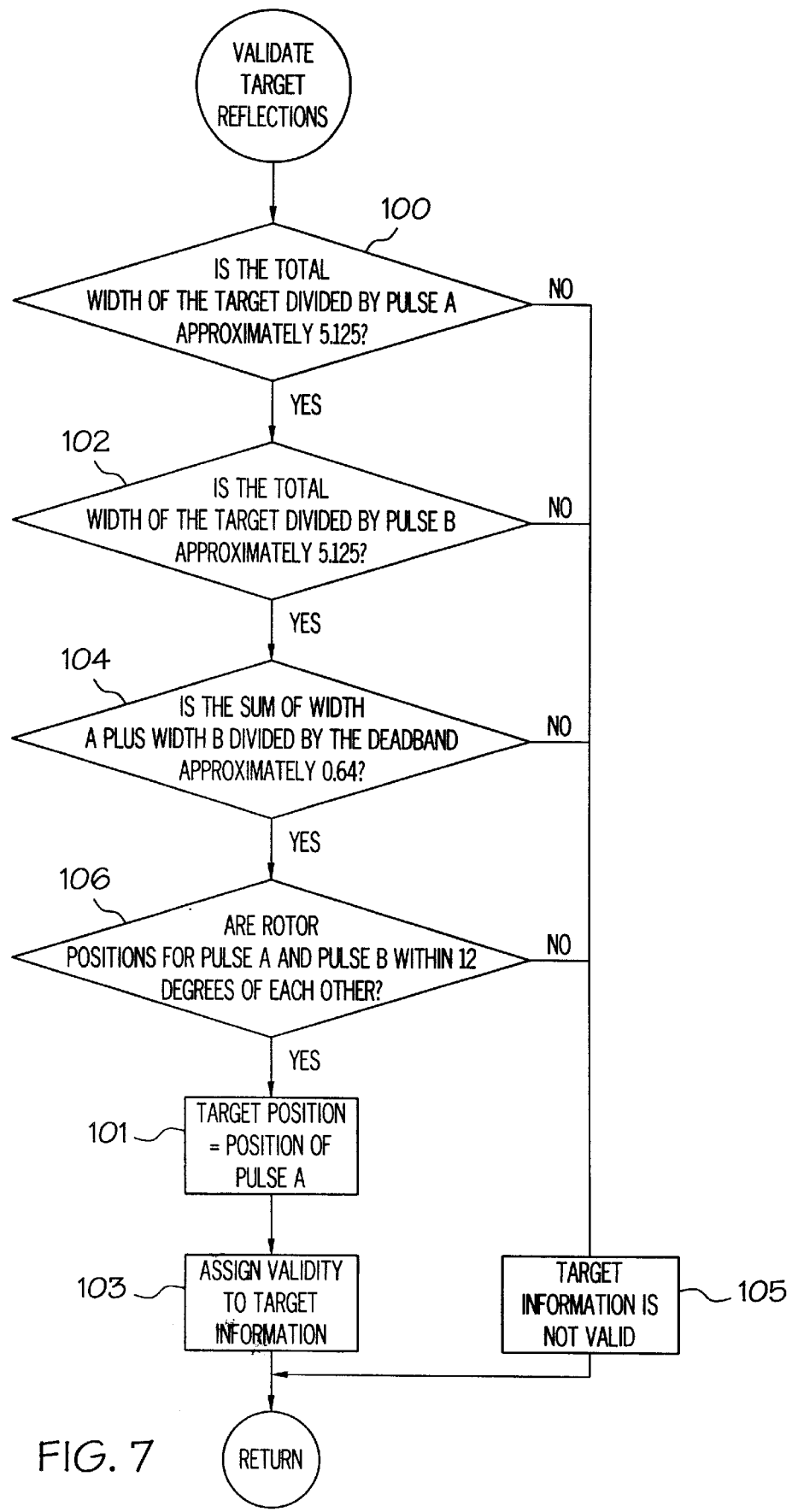
FIGS. 7 and 8 are flow charts illustrating the gain and threshold adjustment and target validation aspects of the laser transmission system of the present invention.

According to another embodiment of the present invention, a particular target position is validated in the manner illustrated in FIG. 7, wherein a flow chart representing the validation procedure is illustrated. The duration of the reflected light pulses 64a, 64b (see FIG. 4) corresponds to the relative widths of the first and second reflective sections 58a, 58c of the target 58. A relative width, as referenced herein, is a mathematical relation of two or more widths, e.g. a ratio. The widths a, b, c of the first and second reflective sections 58a, 58c and the non-reflective section 58b are known or predetermined values. Accordingly, the relative widths of the predetermined widths a, b, c of the respective sections 58a, 58b, 58c are predetermined values as well.

The controller 90 is programmed to identify a measured relative width of each of the discrete target portions 58a, 58b, 58c based upon the reflected laser beam signal 64 and the rotary signal. The controller 90 then determines whether the reflected laser beam signal 64 corresponds to a valid target based upon a comparison of the measured relative widths and the predetermined relative widths a, b, c. Specifically, the controller 90 is programmed to identify a first ratio corresponding to the measured relative width of one of the discrete target portions 58a, 58b, 58c with respect to the relative width of the active or total target portion 58d, see steps 100 and 102, FIG. 7. The determination of whether a potential target is valid depends upon whether the first ratio corresponds to the ratio of the predetermined relative widths, e.g., 5.125. Finally, the controller 90 causes the optical system 17 to generate a reference laser beam 12 in either the search mode or the target dither mode based upon whether the reflected laser beam signal 64 corresponds to a valid target.

According to a further target validation step, a second ratio of a measured relative width is identified. The second ratio corresponds to the sum of measured relative widths of the first and third target portions 58a, 58c with respect to the width of the second target portion 58b, see step 104, FIG. 7. The determination of whether a potential target is a valid target depends upon whether the second ratio corresponds to the ratio of the predetermined widths, e.g., 0.64.

According to another target validation step, see step 106, the reflected signal 64 and the rotary signal are analyzed to verify that the positions for the first and second reflective pulses 64a, 64b are within 12 degrees of each other. If each validation step is passed, the trailing edge of the first pulse is identified as the valid target position, see steps 101 and 103. Otherwise, the target information is assigned an invalid status, see step 105.

An apparatus and technique for adjusting the gain and threshold values of the detection module 32 according to another embodiment of the present invention are described with reference to the flow chart of FIG. 8. As is noted above, the controller 90 or processor 90 is programmed to establish predetermined gain and threshold values for the reflected laser beam signal 64. The gain and threshold values are changed to increase the sensitivity of the laser transmitter if a particular validation routine, e.g., one or more of the validation routines described herein with reference to FIG. 7, does not result in a valid target determination within a predetermined amount of time. For example, the threshold value is changed and/or the gain value is changed where the reflected laser beam signal 64 does not correspond to a valid target.

Figure 8:
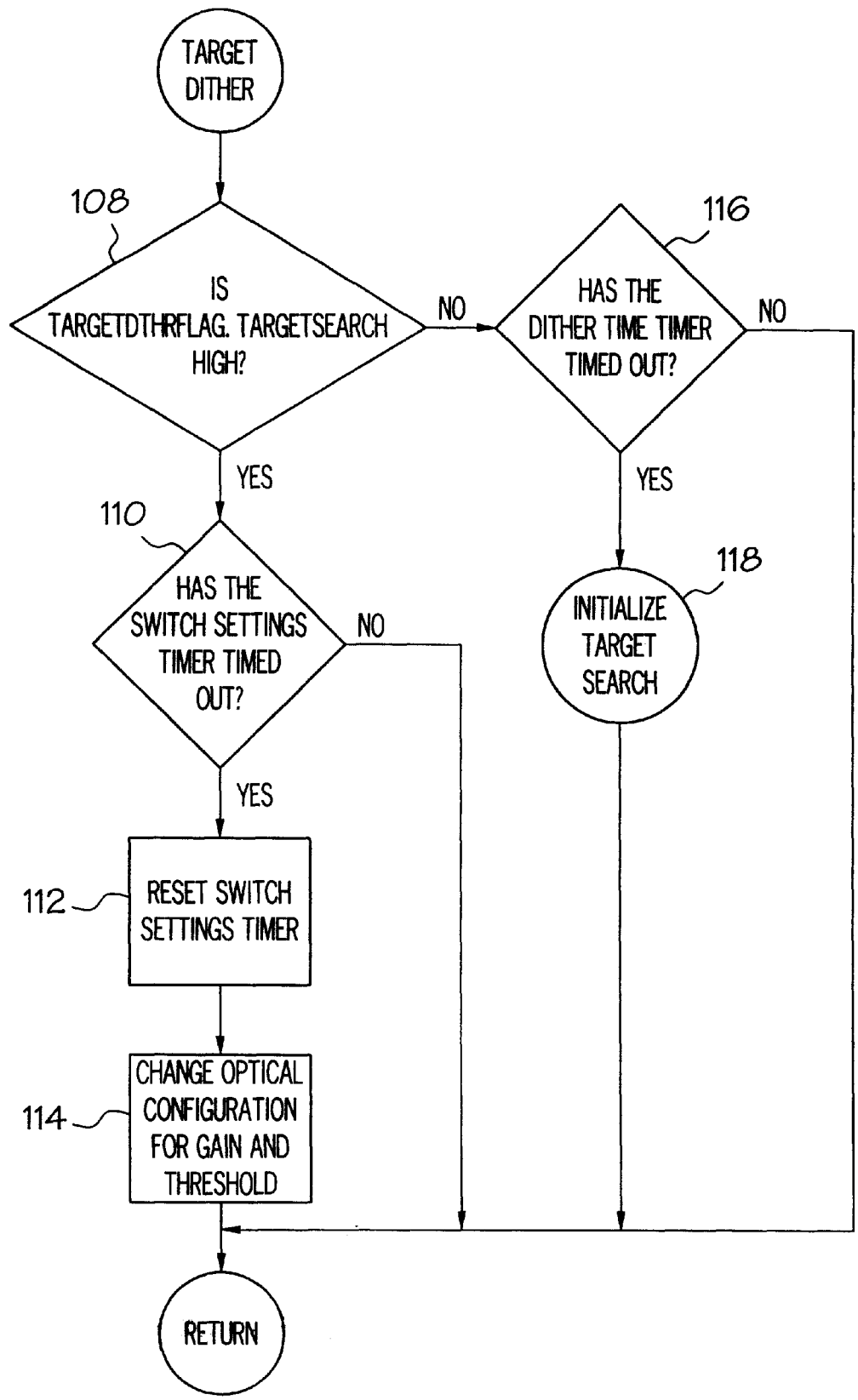

Referring now to FIG. 8, the procedure for adjusting the gain and threshold values is described. In step 108 it is determined whether the optical system 17 is in the search mode or the target dither mode. If the system 17 is in the target dither mode, then dithering continues until the dither timer times out, at which point a new target search is initialized, see steps 116 and 118. If the system is in the search mode, meaning a target has not been detected, and if the switch setting timer has timed out, meaning a predetermined search time has expired prior to identification of a target 58, then the switch settings timer is reset and the gain and threshold are adjusted and set for a new target search, see steps 110, 112, 114. As is noted above, the gain and threshold are adjusted to alter the sensitivity of the detection module 32 to reflected laser beam signals.

Referring now to FIGS. 9–15, the operational sequence of the laser transmission system 8 according to the present invention are illustrated. The main program routine is shown in FIG. 9. The main routine controls the system 8 during normal operation until the target dither routine is activated, see step 120. If target dither is not activated, the program returns to the main routine. If target dither is activated, the program determines if target dither is initialized, see step 122. If the target dither routine is not initialized, the program executes the initialize target dither routine, see FIG. 11. If target dither is initialized, the target dither routine is executed, see FIG. 8.

Referring now to FIG. 10, an interrupt routine is described. The laser transmitter 10, including target dither hardware 11, continually scans for the reflected laser beam 62. As described above, the detection module 32 detects the reflected laser beam 62 and the processor 90 determines the time intervals for each transition which exceeds the set threshold voltage. The interrupt routine is triggered when a reflection which exceeds the set threshold voltage is detected. The decode pulse information routine is triggered if the program determines that the software input capture interrupts are enabled, see step 124.

Figure 11:
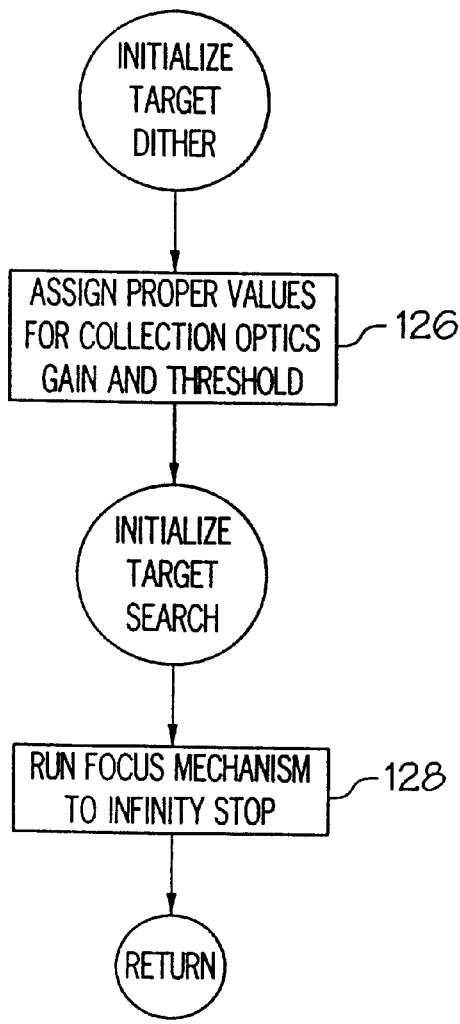
Figure 12:
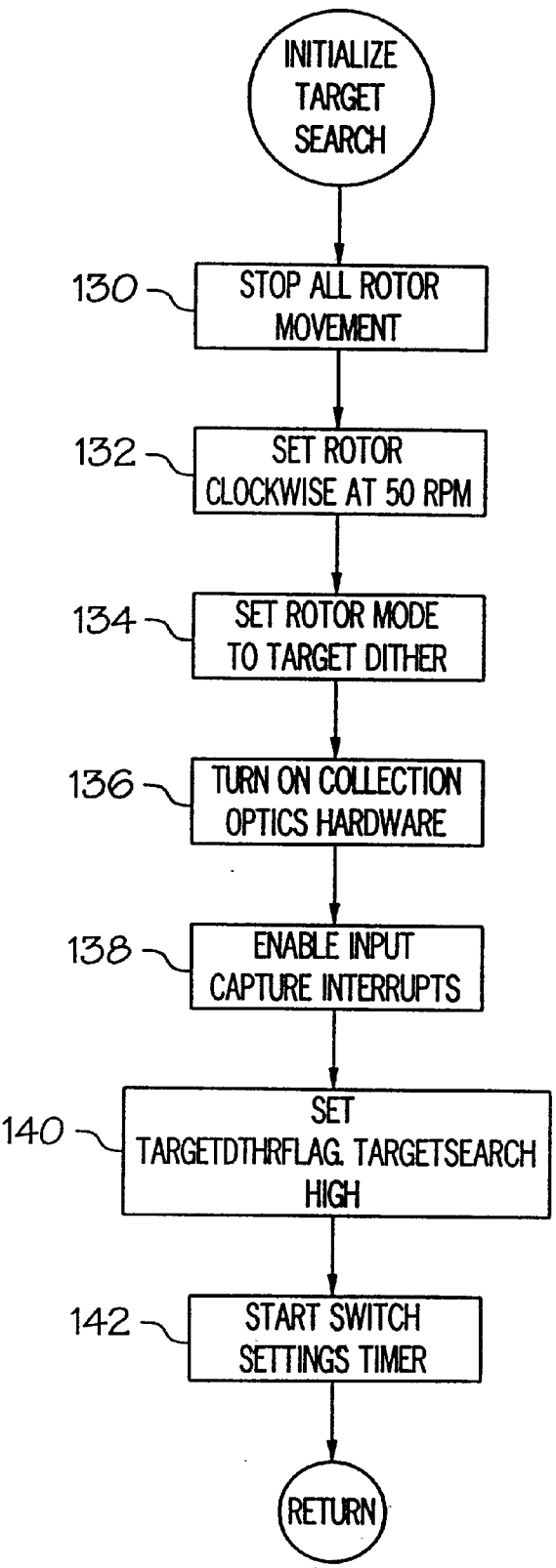

The initialize target dither routine is described with reference to FIG. 11. Suitable gain and threshold values are assigned in step 126 and the focus mechanism is brought to infinity stop to maximize reflected pulse detection range, see step 128. The initialize target search routine is illustrated in detail with reference to FIG. 12. The rotary motion of the laser transmitter is stopped, see step 130, and subsequently set clockwise at 50 RPM, see step 132. The target dither mode is set, see step 134, and the collection optics hardware, e.g., the detection module 32, is activated, see step 136. The input capture interrupts, see step 124 of FIG. 10, are enabled in step 138 and the dither/search flag, referred to above with respect to FIG. 8, is set high in step 140. Finally, the switch settings timer, also referred to above with respect to FIG. 8, is started. It is contemplated that the rotary motion of the transmitter need not be completely stopped to initialize target dither.

Figure 13:
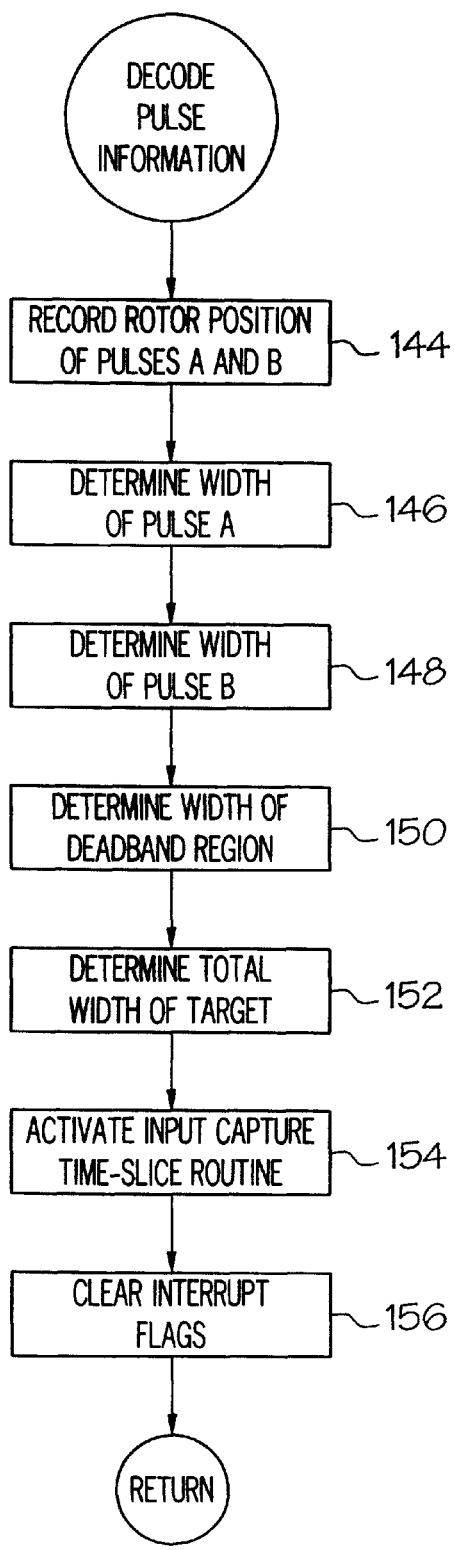
Figure 14:
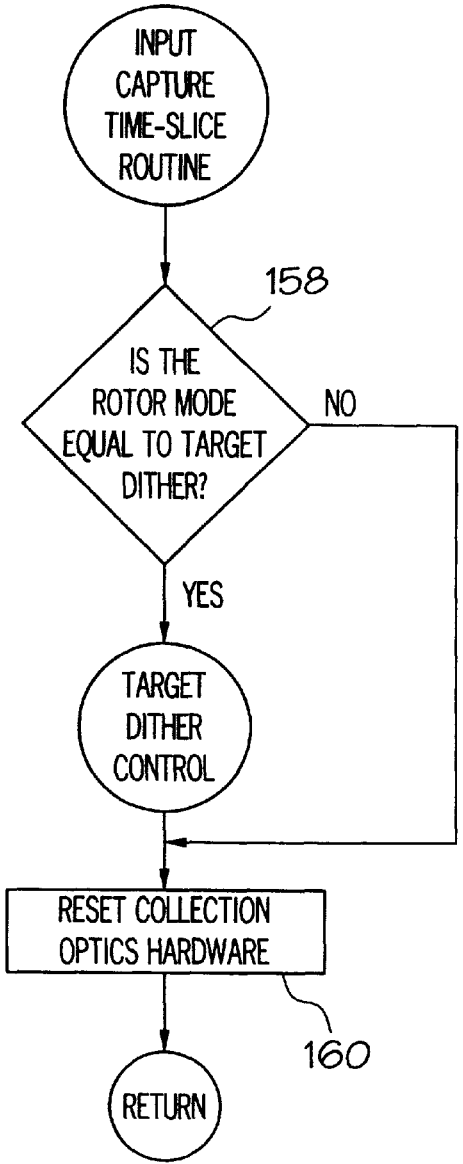

The decode pulse information routine, referred to herein with reference to FIG. 10, is described in detail with reference to FIG. 13. The rotor position corresponding to pulses A and B,. i.e., the first and second reflective pulses 64a, 64b, are recorded in step 144, and the respective widths of the pulses, the intermediate deadband region, i.e., the width of the second target portion 58b, and the active or total target portion width 58d, are determined in steps 146, 148, 150 and 152. Subsequently, the capture time slice routine illustrated in FIG. 14 is queued to execute at the next available program period, see step 154, and the interrupt flags referred to above with respect to FIG. 10, are cleared, see step 156.

Figure 15:
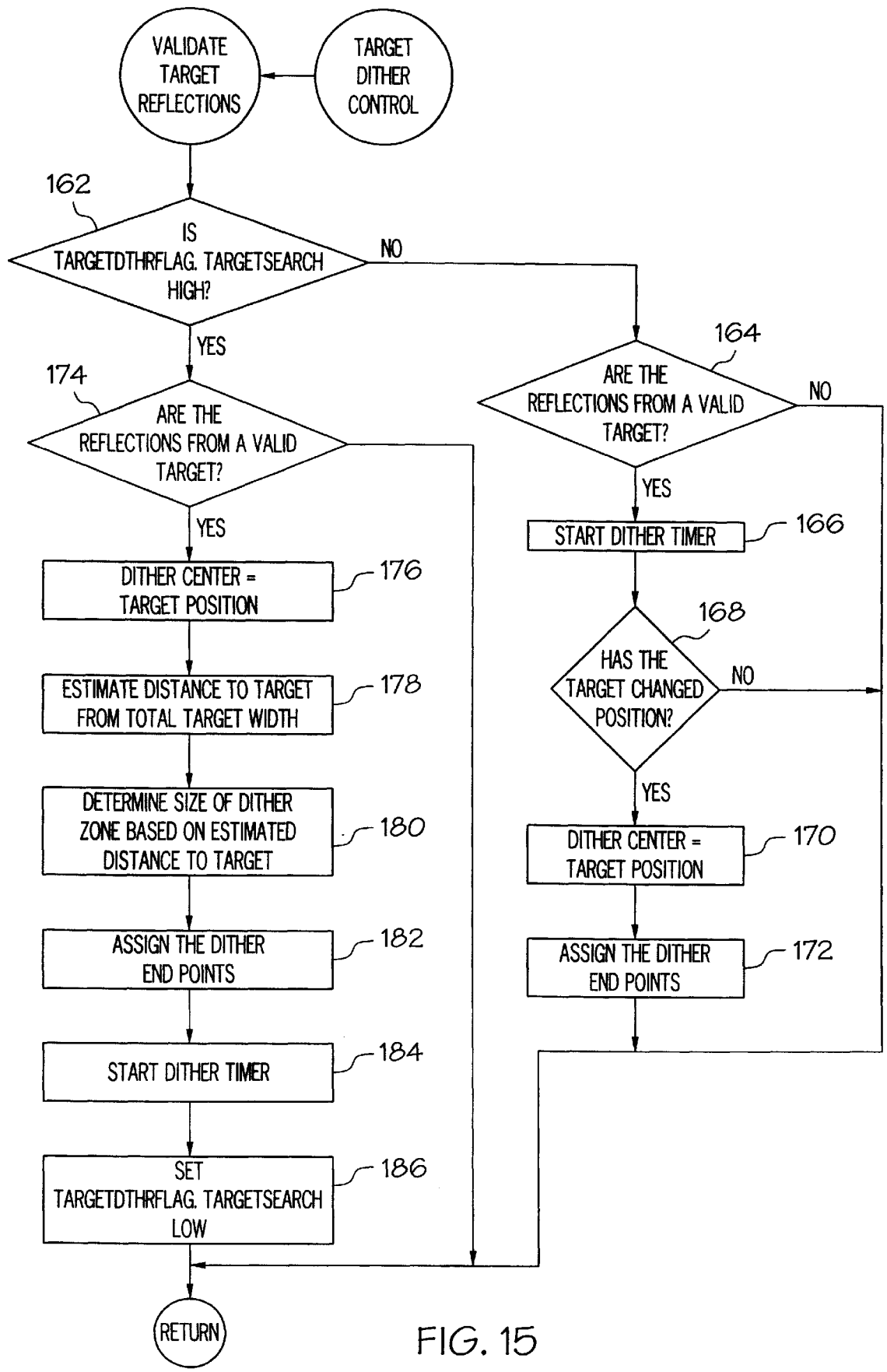

The input capture time slice routine is described in detail with reference to FIG. 14, wherein it is first determined whether the target dither mode is activated, see step 158. If the active mode is the target dither mode, then the target dither control routine of FIG. 15 is activated. If not, then the collection optics hardware is reset and the time slice routine is completed, see step 160.

Referring now to FIG. 15, the target dither control routine, which includes the validate target reflections routine of FIG. 7, is described in detail. Initially, in step 162, it is determined whether the dither/search flag, referred to above with respect to FIG. 8, is high (searching for target) or low (dithering). If the dither/search flag is low, the reflections are from a valid target, see step 164, and the target has changed position, see step 168, a new target position and corresponding dither end points are assigned, see steps 170 and 172. If the dither search flag is low and if the reflections are from a valid target, a dither timer, which tracks dither duration, is started, see step 166. If the dither search flag is high and if the reflections are from a valid target, see step 174, then a target position is assigned, see step 176, the target distance is estimated, see step 178, the angular size of the dither zone is determined, see step 180, the dither end points are assigned, see step 182, the dither timer is started, see step 184, and the dither/search flag is set low, indicating that a valid target has been identified, see step 186. It is contemplated by the present invention that the target position may be defined along any point relative to the target 58, e.g., the center of the dither range, the trailing edge of the first pulse 64a, etc.

Having described the invention in detail and by reference to preferred embodiments thereof, it will be apparent that modifications and variations are possible without departing from the scope of the invention defined in the appended claims.

What is claimed is:

1. A laser beam transmitting system comprising:
a reflective target comprising at least two discrete target portions, wherein said discrete target portions define respective predetermined relative widths, and wherein each of said discrete target portions define distinct characteristic reflectances;
a laser detection module operative to produce a reflected laser beam signal;
an optical system arranged to generate a reference laser beam selectively in one of a search mode and a target dither mode and to direct a laser beam reflected from said reflective target to said laser detection module, wherein said optical system defines a central rotational axis, said reference beam projects radially from said central rotational axis, said search mode is characterized by movement of said reference beam through a rotational arc defined about said central rotational axis, and wherein said target dither mode is characterized by movement of said reference beam through a selected portion of said rotational arc;
a rotary encoder arranged to produce a rotary signal indicative of a rotary position of said reference beam relative to said rotational arc; and a controller programmed to
identify a measured relative width of each of said discrete target portions based upon said reflected laser beam signal and said rotary signal,
determine whether said reflected laser beam signal corresponds to a valid target based upon a comparison of said measured relative widths and said predetermined relative widths, and
cause said optical system to generate a reference laser beam in one of said search mode and said target dither mode based upon whether said reflected laser beam signal corresponds to a valid target.

2. A laser beam transmitting system as claimed in claim 1 wherein said reflective target comprises an active target portion defined by first, second, and third discrete target portions defining first, second, and third characteristic reflectances, wherein said second target portion is bounded on opposite sides by said first and third target portions, wherein said second characteristic reflectance is different than said first and third characteristic reflectances, wherein said first, second, and third discrete target portions define respective predetermined relative widths, and wherein said controller is programmed to
identify a first ratio of a measured relative width of one of said discrete target portions with respect to a measured relative width of said active target portion, based upon said reflected laser beam signal and said rotary signal,
determine whether said reflected laser beam signal corresponds to a valid target based upon a comparison of said first ratio and said predetermined relative widths, and
cause said optical system to generate a reference laser beam in one of said search mode and said target dither mode based upon said valid target determination.

3. A laser beam transmitting system as claimed in claim 2 wherein said second characteristic reflectance is relatively low and wherein said first and third characteristic reflectances are relatively high and substantially equal.

4. A laser beam transmitting system as claimed in claim 1 wherein said reflective target comprises a second discrete target portion defining a second characteristic reflectance and first and third discrete target portions defining first and third characteristic reflectances, wherein said second target portion is bounded on opposite sides by said first and third target portions, wherein said first characteristic reflectance is different than said first and third characteristic reflectances, wherein said first, second, and third discrete target portions define respective predetermined relative widths, and wherein said controller is programmed to
identify a second ratio of a measured relative width of said second target portion with respect to a sum of measured relative widths of said first and third target portions, based upon said reflected laser beam signal and said rotary signal,
determine whether said reflected laser beam signal corresponds to a valid target based upon a comparison of said second ratio and said predetermined relative widths, and
cause said optical system to generate a reference laser beam in one of said search mode and said target dither mode based upon said valid target determination.

5. A laser beam transmitting system as claimed in claim 4 wherein said second characteristic reflectance is relatively low and wherein said first and third characteristic reflectances are relatively high and substantially equal.

6. A laser beam transmitting system comprising:
- a reflective target comprising at least two discrete target portions, wherein said discrete target portions define respective predetermined relative widths, and wherein each of said discrete target portions define distinct characteristic reflectances;
- a laser detection module operative to produce a reflected laser beam signal;
- an optical system arranged to generate a reference laser beam in an operational mode and to direct a laser beam reflected from said reflective target to said laser detection module, wherein said optical system defines a central rotational axis, wherein said reference beam projects radially from said central rotational axis, and wherein said operational mode is characterized by movement of said reference beam through a rotational arc defined about said central rotational axis; and
- a controller programmed to
  - identify a measured relative width of each of said discrete target portions based upon said reflected laser beam signal, and
  - determine whether said reflected laser beam signal corresponds to a valid target based upon a comparison of said measured relative widths and said predetermined relative widths.

7. A method of transmitting a laser beam comprising the steps of:
- moving a reference laser beam in an operational mode, wherein said operational mode is characterized by movement of said reference beam through a rotational arc defined about a central rotational axis;
- detecting a laser beam reflected from a reflective target positioned within said rotational arc, wherein said reflective target comprises at least two discrete target portions, wherein said discrete target portions define respective predetermined relative widths, and wherein each of said discrete target portions define distinct characteristic reflectances;
- identifying a position of said target based upon said reflected laser beam;
- identifying a measured relative width of at least two discrete target portions within said target based upon said reflected laser beam; and
- determining whether said reflected laser beam corresponds to a valid target based upon a comparison of said measured relative widths and predetermined relative widths of said at least two discrete target portions.

* * * * *